Feb. 16, 1965     I. RINKEWICH     3,169,666
FLOW TIMER

Filed Oct. 19, 1961     4 Sheets-Sheet 1

INVENTOR.
ISAAC RINKEWICH
BY James and Franklin
ATTORNEYS

Feb. 16, 1965   I. RINKEWICH   3,169,666
FLOW TIMER
Filed Oct. 19, 1961   4 Sheets-Sheet 2

INVENTOR.
ISAAC RINKEWICH
BY James and Franklin
ATTORNEYS

Feb. 16, 1965   I. RINKEWICH   3,169,666
FLOW TIMER

Filed Oct. 19, 1961   4 Sheets-Sheet 3

INVENTOR.
ISAAC RINKEWICH
BY *James and Franklin*
ATTORNEYS

INVENTOR.
ISAAC RINKEWICH
BY James and Franklin
ATTORNEYS

United States Patent Office 3,169,666
Patented Feb. 16, 1965

3,169,666
FLOW TIMER
Isaac Rinkewich, Hasbrouck Heights, N.J., assignor to International Patent Research Corp., New York, N.Y., a corporation of New York
Filed Oct. 19, 1961, Ser. No. 146,270
11 Claims. (Cl. 222—20)

The present invention relates to a device for measuring the flow of fluid and automatically terminating that flow when a predetermined amount of fluid has passed therethrough.

A demand exists for devices which will automatically shut off a flow of fluid after a predetermined amount of fluid has passed therethrough, and for such devices which can be manually set to measure different amounts of fluid. For example, in connection with lawns different amounts of sprinkling are desired from time to time in accordance with the initial condition of the lawn, more sprinkling being required when the ground is very dry and less sprinkling being required when the ground is only slightly dry. Over-sprinkling is deleterious. While manual control is possible and is usually resorted to, this is essentially unsatisfactory, not only in instances where the number of sprinkling operations carried on simultaneously makes individual manual supervision of each operation impractical, as on a golf course or on a large estate, but also where only a single sprinkling operation is carried on but the person in charge finds it inconvenient or impossible to provide continued close supervision. For example, a home owner may wish to have his lawn sprinkled while he is busy with other things or while he is away from home, yet he does not wish the lawn to become flooded or over-saturated with water.

Devices to accomplish theis function are known, but they are in the main complicated, expensive and unreliable. The flow of fluid through and around the many operative parts of the timing mechanism tends to cause loss of fluid pressure, with a consequent decrease in the efficacy of the sprinkling operation, and also tends toward rapid deterioration of those parts, with consequent malfunctioning of the device. Making the device manually settable to measure different amounts of fluid flow—a practical necessity—has made for great complexity, and hence less reliability. When, as is desirably the case, the force involved in terminating the fluid flow is derived from the flow of fluid itself, positive closing of the flow passage has presented a serious problem; as the flow decreases the force available for further moving the closing valve to closed position decreases, with the result that the flow is often reduced to a trickle but not positively shut off, thus leading to flooding of the area where the sprinkler is located. The control device must itself be fluid-tight, so that leakage and consequent flooding will not occur at its location. The device must be one which can readily be connected to and disconnected from the flow line, so that it can be used or not, as desired. The setting of the device to measure either small or large amounts of flow must be accomplished simply and in a foolproof manner. All of these design problems have in the past made it difficult, if not impossible, to produce a device of this type which is sturdy and reliable enough, and also inexpensive enough, to be sold to the home sprinkler market.

It is the prime object of the present invention to design such a device which satisfies the design requirements set forth above and which is nevertheless attractive, inexpensive and reliable enough to be purchased and used by the ordinary non-technically-trained home owner. To this end the parts of the timer are so arranged that fluid flows freely through the device, acting only upon an impulse wheel. The actual measuring and operating mechanism is disposed in a compartment separate from the through passage for fluid flow. The adjustable control mechanism is so designed that it can be set for measuring either very small or quite large amounts of fluid. The valve which cuts off fluid flow through the device is moved rapidly and positively to its "off" position when the predetermined amount of fluid has been measured, the force for thus moving the valve being independent of the fluid flow itself. In its preferred form the adjustable portion of the control mechanism can be moved in either direction manually, thus requiring only a small setting movement to condition the device to measure large quantities of flow. The parts are designed and arranged in such a manner as to facilitate assembly and provide a maximum degree of protection for the moving parts.

To the accomplishment of the above, and to such other objects as may hereinafter appear, the present invention relates to the construction of a flow timer, as defined in the appended claims and as described in this specification, taken together with the accompanying drawings, in which:

Figure 1:
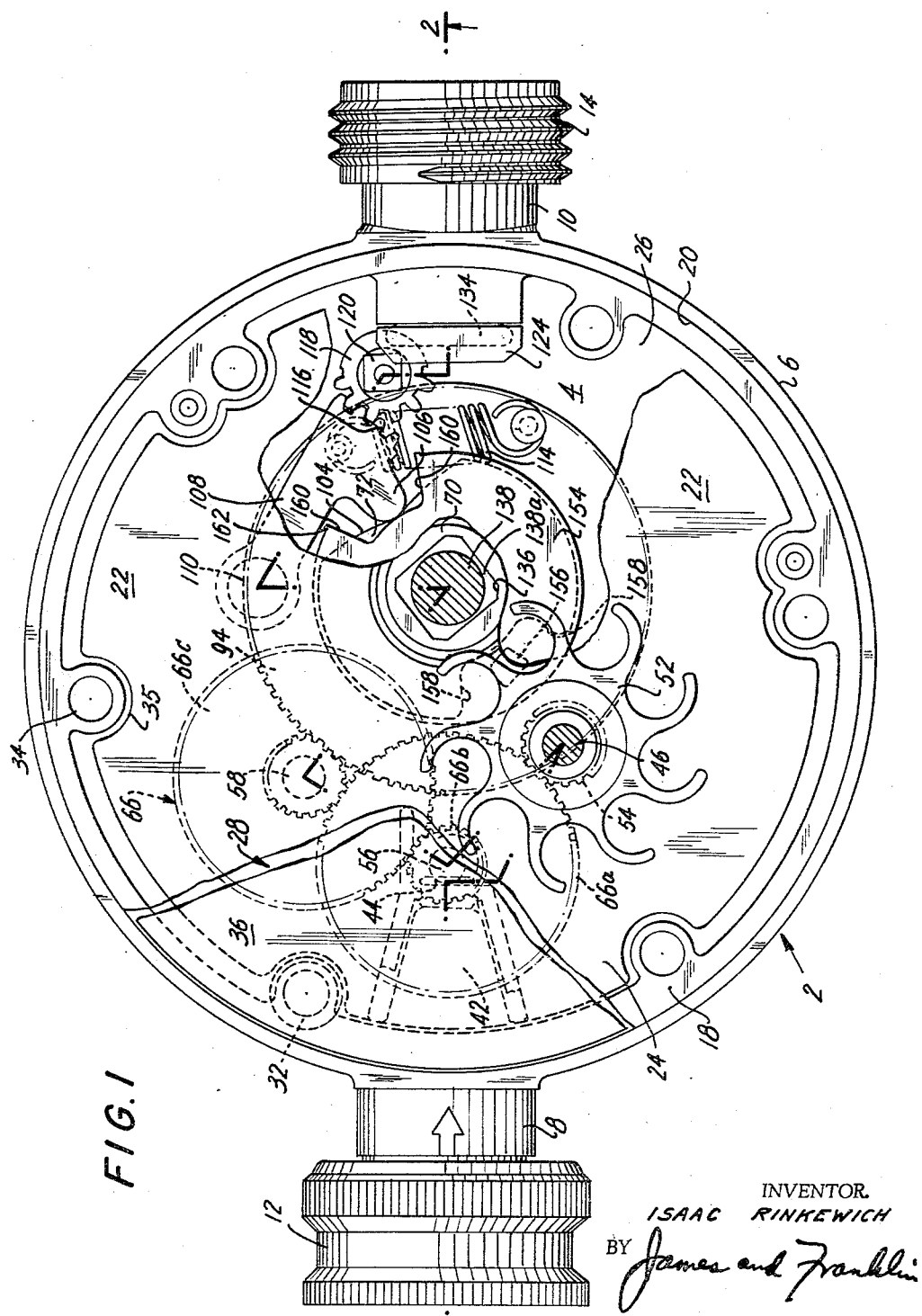
FIG. 1 is a top plan view, partially broken away, of one embodiment of the present invention.

The flow timer of the present invention comprises a housing generally designated 2 having a bottom wall 4 and an upstanding side wall 6. An inlet port 8 is provided in the side wall 6 preferably at a point diametrically opposite the inlet port 8. The inlet port 8 may be provided with a fitting 12 of the female type into which the end of a hose or a spigot may be screwed, while the outlet port 10 is provided with a fitting 14 of the male type over which the end of a hose may be screwed. The interior of the housing is provided with a ledge 16 located below the ports 8 and 10 and with a second ledge 18 located thereabove, and an upstanding rim flange 20 surrounds the ledge 18.

A partition member generally designated 22 is adapted to be seated upon the ledge 16 and to extend substantially completely across the interior of the housing 2 so as to divide that housing into an upper compartment 24 and a lower compartment 26. A cover member generally designated 28 is adapted to be seated on the ledge 18, preferably with a gasket 30 compressed between itself and the ledge 18, the cover member 28 closing the open top of the housing 2 and being held in place in any appropriate manner, as by screws 32 received within apertures 34 formed in thickened upper portions 35 of the side wall 6. An ornamental plate 36 is adapted to be pressed into place over the cover 28 and inside the rim flange 20 in order to hide the screws 32 from view. The partition 22 and the cover member 28 are provided with cooperating parts 38 and 40 respectively defining a nozzle passage 42 and nozzle orifice 44 through which water must flow from the inlet port 8 into the upper compartment 24.

A shaft 46 has its upper end rotatably mounted in bearing 48 carried by the cover member 28 and its lower part extending down through the partition 22 and journaled in bearing 50 carried by that partition. Keyed to the shaft 46 for rotation therewith, and located in the compartment 24 opposite the nozzle orifice 44, is an impulse wheel 52, the position of the wheel being such that as fluid enters the compartment 24 through the nozzle orifice 44 it impinges upon the wheel 52 and rotates the latter. The wheel 52 thus functions as a fluid flow sensor.

The lower end of the shaft 46 projects into the lower compartment 26 and carries a pinion 54 keyed thereto for rotation therewith. A pair of shafts 56 and 58 are mounted on the lower face of the partition 22 and on bosses 60 and 62 respectively extending up from the bottom housing wall 4, and a system of reduction gears generally designated 66 is rotatably mounted on these shafts, the uppermost reduction gear 66a meshing with pinion 54, having a pinion 66b meshing with gear 66c, that gear having a pinion 66d meshing with gear 66e, and so on to provide the desired amount of speed reduction, the gear train terminating in pinion 66z.

The partition 22 is provided with an aperture 68 within which the upstanding hub 70 of cam 72 is rotatably mounted, the cam constituting an adjusting element which is manually settable in a manner described later in this specification. The cam 72 is provided with a non-circular opening 74 within which the correspondingly non-circular portion 76 of shaft 78 is received, the shaft 78 and cam 72 being held in assembled condition by means of spring nut 80. The body of shaft 78 is non-circular and has a collar 82 mounted thereon with a correspondingly non-circular central opening 84, that collar therefore being rotatable with the shaft 78 and slidable axially therealong. A spring 86 is compressed between the undersurface of the cam 72 and the upper surface of the collar 82 so as to urge the later downwardly. The collar 82 has a downwardly extending rim flange 88 with a conical inner surface 90 which telescopically frictionally mates with a correspondingly conical surface 92 on an upstanding portion of gear 94. Gear 94 meshes with pinion 66z and has a round central opening 96 which is received over a correspondingly round portion 98 of the shaft 78, the gear 94 resting on a flange 100 formed as part of the shaft 78 which in turn rests upon the boss 102 extending up from the housing between wall 4, the lower end 78a of the shaft 78 being journaled in that boss 102.

The cam 72 has cam surface 104 adapted to act upon cam follower 106 formed as a part of arm 108 pivotally mounted on the underside of the partition 22 so as to pivot about downwardly extending boss 110, the arm 108 being held in place on the boss 110 by means of stud 112. A tension spring 114 is active on the arm 108 so as to urge the follower 106 into engagement with the cam surface 104. The arm 108 is provided with a rack portion 116 which meshes with gear 118 fast on shaft 120, the latter being journaled in the partition 22 and extending up into the upper compartment 24, its upper end 120a being journaled in boss 122 extending down from the cover member 28. The shaft 120 carries arm 124 which in turn carries valve member 126. The valve member 126 has a rearwardly extending stem 130 received with clearance in an aperture 132 in the arm 124, thus permitting the valve member 126 to be self-aligning with respect to the exit orifice 128. The orifice-engaging face of the valve member 126 is provided with a sealing ring 134 to ensure that a proper seal is made when the valve member 126 is in valve-closing position.

When the cam follower 106 is engagement with the radially inner portion of the cam surface 104 the shaft 120 is rotated so as to bring the valve member 126 into sealing engagement with the exit orifice 128 communicating with the exit port 10, thus preventing escape of fluid therethrough. When the cam 72 is rotated so that the cam follower 106 is in engagement with radially outwardly located portions of the cam surface 104, the shaft 120 is rotated so as to remove the valve member 126 from the exit port 128 and thus permit fluid to flow through the upper compartment 24.

To provide for manual adjustment of the initial position of the cam 72, it is provided with an upwardly facing recess 136 of non-circular cross section which opens into the upper compartment 24. A shaft 138 has a lower end portion 138a received within the recess 136 and having a non-circular cross section corresponding thereto. The upper portion 138b of the shaft 138 extends through and beyond an opening 140 in the cover member 28, that opening being sealed by means of sealing ring 142 and washer 144. A manual adjusting knob 146 is located above the cover member 28 and is non-rotatably mounted on the shaft 138, as by having a recess 148 of non-circular cross section received over a correspondingly non-circularly shaped portion 138c of the shaft 138, a spring nut 150 maintaining the knob 146 and shaft 138 in assembled position. A cover plate 151 may be press-fitted into recess 152 in the upper surface of the knob 146 for decorative effect, and to hide from view the upper tip of the shaft 138 and the spring nut 150.

The operation of the device of the present invention, as thus far described, is as follows. Normally (see FIG. 1) the cam 72 is in a position such that the cam follower 106 engages with the radially inner portion of the cam surface 104, the valve 126 is closed, and no fluid can flow through the device. When fluid flow is desired the knob 146 is manually rotated in a clockwise direction. This will rotate the cam 72 correspondingly, the cam follower 106 will be moved to its position shown in FIG. 3, in which it engages a radially outer portion of the cam surface 104, the valve 126 will be opened and fluid will flow through the upper compartment 24. When cam 72 is thus manually rotated the shaft 78 will rotate therewith, and with it the collar 82. However, the gear 94 will remain stationary, the engaging conical surfaces 90 and 92 slipping over one another and the flange 100 slipping beneath the gear 94. Thus the setting of the cam 72 may be accomplished without having to drive back through the reduction gearing 66.

When the valve 126 opens fluid flows through the upper compartment 24. It enters via the port 8, the nozzle passage 42 and nozzle orifice 44, impinges upon the impulse wheel 52 and causing it to rotate, and exits through the orifice 128 and the port 10. The rotated impulse wheel 52 drives the reduction gearing 66 in such a sense as to cause the cam 72 to rotate counter-clockwise and turn back to its initial position, this rotation being drivingly transmitted to the shaft 78 on which the cam 72 is fixed by means of the frictional connection between the surface 92 on the gear 94 and the mating surface 90 on the collar 82 which is non-rotatably mounted on the shaft 78. As the cam 72 returns to its initial position the cam follower 106 will move inwardly, thus causing the valve 126 to move back to valve-closing position. The amount of fluid which flows through the upper compartment 24, together with the distance the cam 72 was manually moved from its initial valve-closing position, will determine the time when the valve 126 is closed; the farther the valve 72 is manually rotated from its initial position, the more water will flow through the device before flow is cut off.

In order to permit the cam 72 to be manually positioned through the application of a normal amount of force, the cam surface 104 must be rather gradually sloped between its radially inner and radially outer portions. However, when the cam 72 is returned to its initial position by the flow of water, it moves slowly, by reason of the rather appreciable speed reduction produced by the gear train 66. If the valve 126 is permitted to close gradually, there will come a time when it is only partially closed, thus reducing the flow of fluid through the device without completely stopping that flow, and the flow of fluid will become sufficiently slow so as to be incapable of further driving the impulse wheel 52 and the gearing 66. The result will be that the device will not turn itself off completely.

Figure 2:
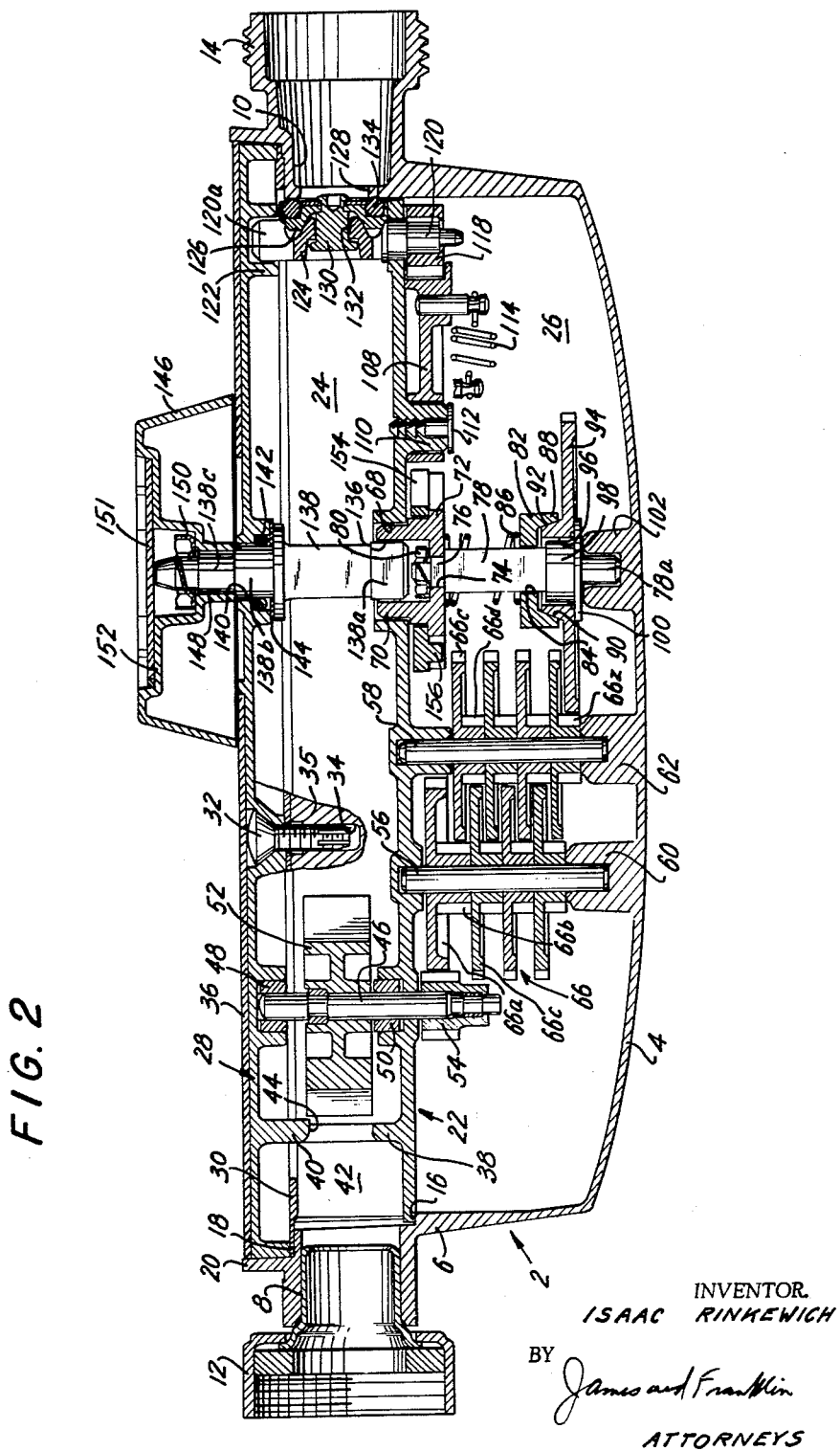
FIG. 2 is a side cross sectional view taken along the line 2—2 of FIG. 1.
Figure 4:
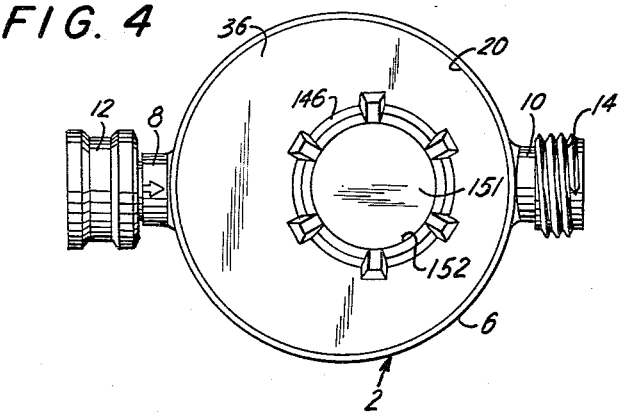
FIG. 4 is a top plan view, on a reduced scale, of the flow timer.

In order to eliminate this undesirable effect, in the embodiment of FIGS. 1–2 a disk 154 is rotatably mounted on the cam 72, the disk 154 having a downwardly extending projection 156 received within slot 158 located on the cam 72 opposite the cam surface 104. The disk 154 has a peripheral opening 160 opposite the projection 156 and normally in registration with the radially innermost portion of the cam surface 104. The outer diameter of the disk 154 is comparable to the diameter of the radially outermost portion of the cam 104, and a small projection 162 is provided on the outer surface of the disk 154 immediately adjacent its peripheral opening 160. With this construction, when the cam 72 is initially rotated clockwise from its initial position through rotation of the knob 146, the disk 154 moves therewith until one side of its peripheral opening 160 engages the cam follower 106. Thereafter the cam 72 continues to rotate while the disk 154 remains stationary, this movement being permitted by reason of the width of the slot 158 in the cam 72 within which the disk projection 156 is received. Once the cam surface 104 has moved the follower 106 all the way out (and substantially in line with or beyond the outer surface of the disk 154), an end of the slot 158 will engage the disk-carried projection 156 and cause the disk 154 to rotate once again with the cam 72, the cam follower 106 then riding along the outer surface of the disk 154. When the cam 72 is rotated in the opposite (counter-clockwise) direction by the impulse wheel 52 and the gearing 56 the disk 154 will tend to move along therewith until the projection 162 engages with the cam follower 106. This will occur approximately at the time when the inwardly inclined portion of the cam surface 104 comes opposite the follower 106. The cam 72 will continue to turn, but the disk 154 will be held by engagement between the cam follower 106 and the disk projection 162. The cam follower 106 will thus be retained in its fully outer position and the valve 126 will remain fully open. When the cam 72 has rotated to a position just short of its initial position, that is to say, when the radially innermost portion of the cam surface 104 is opposite the cam follower 106, the other end of the slot 158 will engage the disk projection 156 and positively rotate the disk 154 in a counter-clockwise direction. The disk 154 will thus be moved away from the cam follower 106 and the latter will then be moved inwardly by the spring 114 through the peripheral opening 160 of the disk 154 in one quick continuous movement until it engages the radially innermost portion of the cam 104. In this way the valve 126 is moved quickly and positively to its fully closed position at the proper time. The force for the closing movement is derived from the spring 114, and hence closing may be effected independently of the force of the fluid flow.

Figure 3:
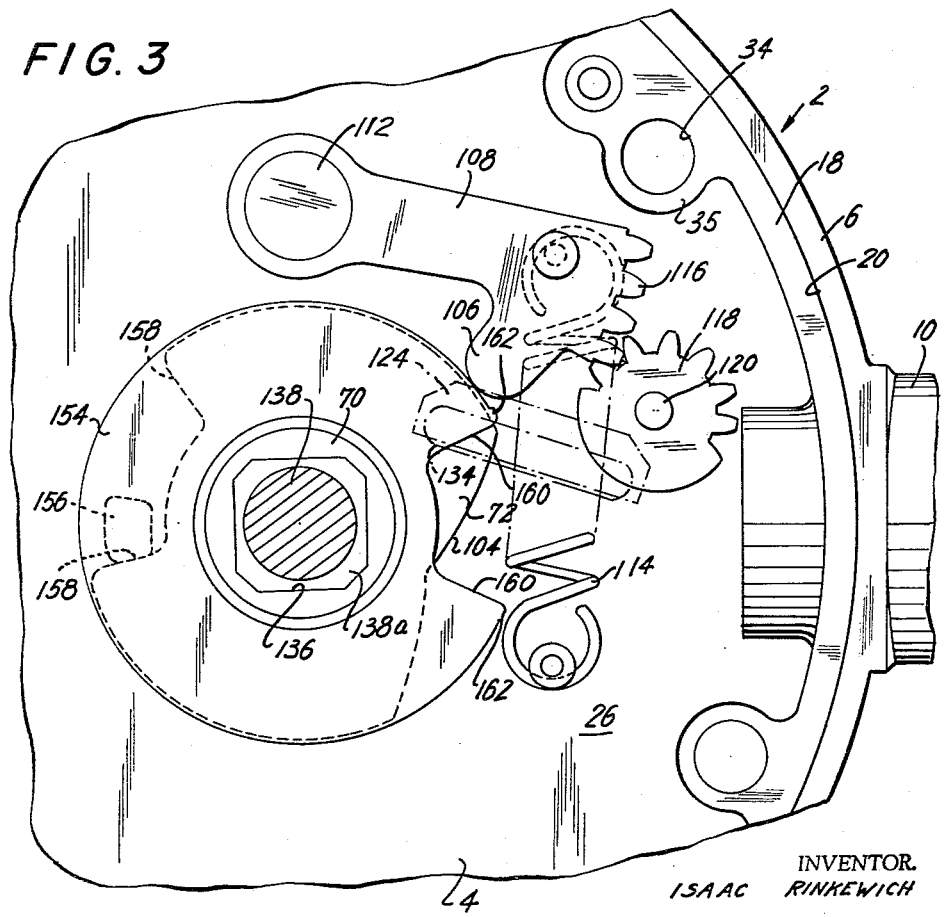
FIG. 3 is a detail top plan view, on an enlarged scale, of a portion of the mechanism shown in FIG. 1 with the partition member removed, the illustrated parts being shown in an operative postion different from that shown in FIG. 1.
Figure 5:
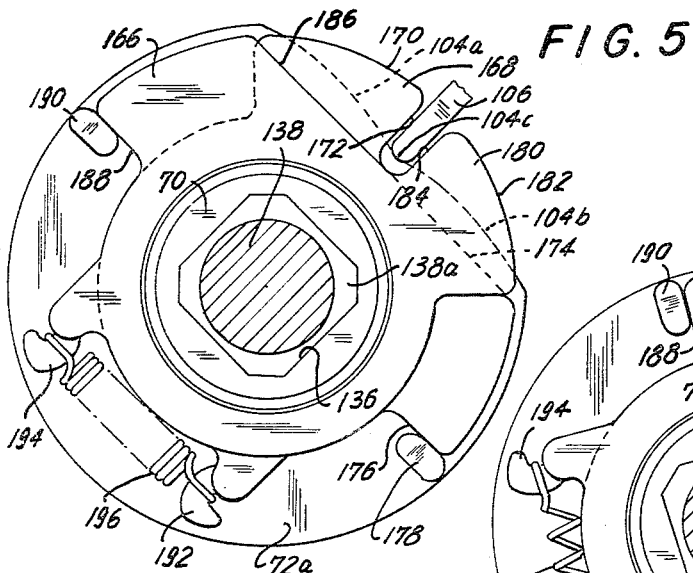
FIGS. 5, 6 and 7 are top plan views of an alternative embodiment of the manually settable adjusting element forming a part of the device of the present invention and showing the operative relationship between the parts for different operative positions of the adjusting element.
Figure 6:
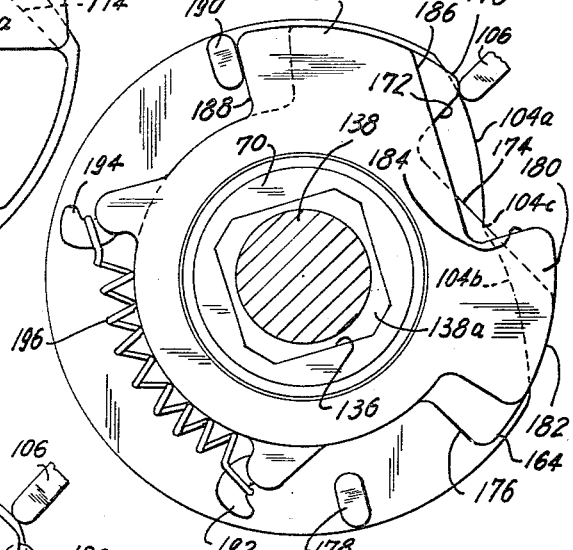
Figure 7:
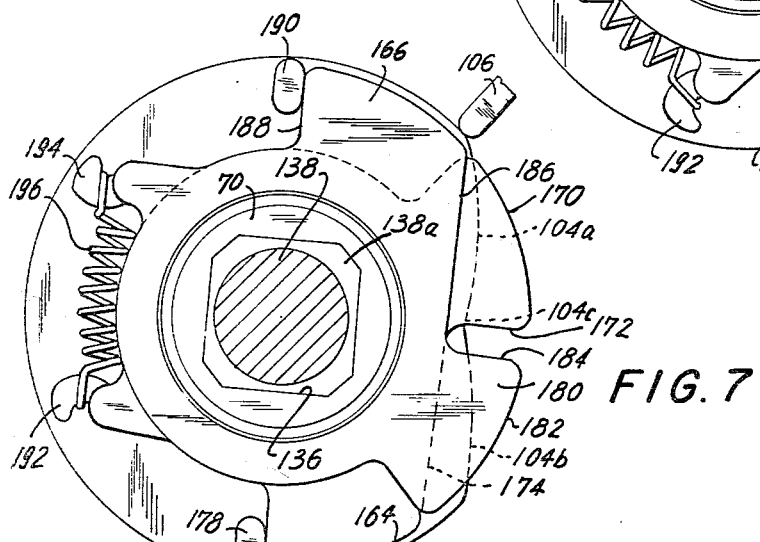
Figure 8:
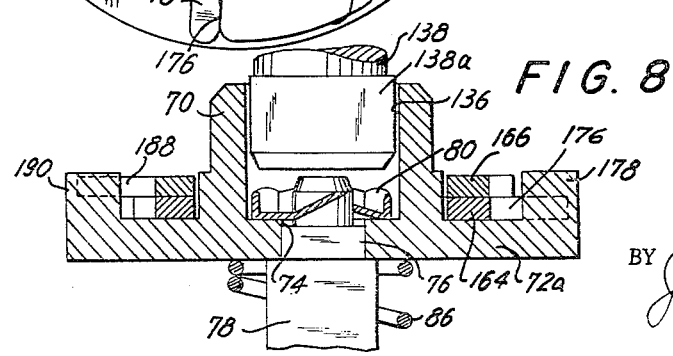
FIG. 8 is a cross sectional view taken along the line 8—8 of FIG. 5.

As disclosed in FIGS. 1–3 the valve 72 must always be turned in the same direction (clockwise) for setting purposes. Thus, if a large amount of fluid flow is to be sensed before the device is turned off the adjusting knob 146 must be turned through substantially a complete revolution. It would be advantageous if the knob 146 could be turned in either direction for setting purposes, so that it could be moved through the most direct path available to its desired set position, while at the same time providing for the quick closing feature just described. The construction shown in FIGS. 5–8 permits this to be accomplished. There the cam 72a is provided with a pair of radially outwardly inclined cam surfaces 104a and 104b extending in opposite direction from the central point 104c. A pair of disks 164 and 166 are rotatably mounted on the cam 72a, the disk 164 being mounted directly upon the cam 72a and disk 166 being mounted on the disk 164. The disk 164 is provided with a lobe 168 to one side thereof, that lobe having an outer surface 170 radially located in a position corresponding to the radially outermost portion of the cam surface 104a, a side surface 172 extending inwardly to a point radially inside the central cam surface point 104c and a connecting surface 174 located radially inside the cam surface 104b. It is also provided with a rearwardly facing surface 176 normally engaged with a stop 178 extending up from the cam 72a. The disk 166 is similarly but oppositely shaped relative to the disk 164, having a lobe 180 with an outer surface 182, a side surface 184, a connecting surface 186 and a rearwardly facing surface 188, the latter cooperating with stop 190 carried by the cam 72a. Each of the disks 164 and 166 are provided with outwardly extending lugs 192 and 194 respectively, between which the tension spring 196 is connected, the spring serving to rotate the disks 164 and 166 to their positions shown in FIGS. 5 and 7 in which their rearwardly facing surfaces 176 and 178 are in engagement with the stops 178 and 190 respectively. When in this position their respective surfaces 182 and 184 define between themselves a space within which, when the cam 72a is in its initial valve-closing position, the cam follower 106 is received and engages the central cam point 104c (see FIG. 5). If the cam 72a is now rotated in a clockwise direction as viewed in the figures (see FIG. 6) the side surface 172 of the disk 164 will engage with the cam follower 106, further clockwise rotation of that disk 166 being thus temporarily prevented. As the cam 72a is rotated further the disk 166 will be carried around with it via the stop 190. The spring 196 will be stretched. As the cam 72a is rotated further the cam follower 106 will ride up along the cam surface 104a. As soon as the cam follower 106 has been moved radially outwardly far enough to clear the outer surface 170 of the disk 164 (see FIG. 7) the spring 196 will cause the disk 164 to rotate until its rearwardly facing surface 176 engages with stop 178. The same mode of operation, but with parts reversed, will occur if the cam 72a is initially rotated in a counter-clockwise direction. When the cam 72a is now rotated counter-clockwise back to its initial position via the impulse wheel 52 and the gearing 66, the two disks 164 and 166 will be rotated therewith and will be held in the relative positions shown in FIG. 7 through the action of the spring 196, so that the cam follower 106 will be retained in its valve-opening position until the space between the disk surfaces 182 and 184 comes opposite it, and at that time it will snap down through that space under the influence of spring 114 to its position shown in FIG. 5, thus positively closing the valve 126.

It will be seen from the above description that the actual operating means of the device, apart from the impulse wheel 52 and the valve 126, are all located in the lower compartment 26, where they do not interfere with free flow of liquid through the device. The liquid flows in relatively unimpeded fashion through the upper compartment 24. While the partition 22 does not prevent water from entering the lower compartment 26, it does provide substantial protection against the entry into the lower compartment 26 of deleterious particles or substances. Hence the life of the parts of the operating mechanism is greatly increased and a high degree of dependability is achieved, while at the same time the flow of fluid through the device is accompanied by only an insignificant pressure loss. Moreover, the arrangement of parts as disclosed greatly facilitates the assembly of the device and thus decreases cost. The device may be set to measure large or small amounts of water before turning itself off, the setting may be accomplished in a simple and relatively foolproof manner, and with the application of a minimal amount of force, while at the same time accurate and positive stopping of the fluid flow is achieved. With the cam construction shown in the embodiments of FIGS. 5–8 initial adjustment of the device for measuring a predetermined amount of fluid flow can be accomplished through rotation of the manual adjusting member in either direction.

While but a limited number of embodiments of the present invention have been here disclosed, it will be apparent that many variations may be made therein, all within the scope of the invention as defined in the following claims.

I claim:

1. In a flow timer having a housing including a fluid flow passage therethrough, a valve for controlling flow of fluid through said passage, means for sensing said fluid flow, and means for actuating said valve in accordance with said sensed fluid flow, said actuating means including a manually settable adjusting element; the improvement which comprises a shaft operatively connected to said adjusting element to rotate therewith and having a shoulder remote from said element, a first member drivingly connected to said sensing means, rotatably mounted on said shaft, and axially movable along said shaft into engagement with said shoulder, a second member mounted on said shaft for rotation therewith above said first member and axially movable along said shaft into engagement with said first member, and resilient means active on said second member to move it into engagement with said first member and to move said first member into rotation-transmitting engagement with said shoulder.

2. In the improvement of claim 1, a second shaft operatively connected to said adjusting element to rotate therewith, and a manual adjusting member on the exterior of said housing, said second shaft and said manual adjusting member being connected for simultaneous rotation, thereby to permit said manual adjusting member to adjust the position of said adjusting element.

3. In a flow timer having a housing including a fluid flow passage therethrough, a valve for controlling flow of fluid through said passage, means for sensing said fluid flow, and means for actuating said valve in accordance with said sensed fluid flow, said actuating means including a manually settable adjusting element; the improvement which comprises said adjusting element having a recess of non-circular cross-section, a shaft having a first part axially slidably received within said recess and having a cross-sectional shape corresponding to that of said recess, said shaft having a shoulder remote from said first shaft part and adjacent a second shaft part, said second shaft part having a circular cross-section, a first member drivingly connected to said sensing means, rotatably mounted on said second shaft part, and axially movable therealong into engagement with said shoulder, said shaft having a third part between said first and second parts, said third shaft part having a non-circular cross-section, a second member mounted on said third shaft part above said first member via an aperture in said second member which has a cross-sectional shape corresponding to that of said third shaft part and through which said third shaft part passes, said second member being rotatable with and axially movable along said third shaft part into engagement with said first member, and resilient means active on said second member to move it into engagement with said first member and to move said first member into rotation-transmitting engagement with said shoulder.

4. The improvement of claim 3, said adjusting element having a second recess of non-circular cross-section, a second shaft having a part axially slidably received within said second recess, said part having a cross-sectional shape corresponding to that of said second recess, and a manual adjusting member on the exterior of said housing, said second shaft and said manual adjusting member being connected for simultaneous rotation, thereby to permit said manual adjusting member to adjust the position of said adjusting element.

5. In a flow timer having a housing including upper, intermediate and lower walls spaced from one another, a fluid flow passage being defined between said upper and intermediate walls, a valve for controlling flow of fluid through said passage, means for sensing said fluid flow and means for actuating said valve in accordance with said sensed fluid flow, said actuating means including a manually settable adjusting element; the improvement which comprises said element being mounted on said intermediate wall, a shaft operatively connected to said element to rotate therewith, extending toward and journalled in said lower wall, and having an upwardly facing shoulder remote from said element, a first member drivingly connected to said sensing means, rotatably mounted on said shaft, and axially movable along said shaft into engagement with said shoulder, a second member mounted on said shaft for rotation therewith above said first member and axially movable along said shaft into engagement with said first member, and resilient means active on said second member to move it into engagement with said first member and to move said first member into rotation-transmitting engagement with said shoulder.

6. In the improvement of claim 5, a second shaft operatively connected to said adjusting element to rotate therewith, extending up therefrom, and journalled in said upper wall, and a manual adjusting member on the exterior of said housing, said second shaft and said manual adjusting member being connected for simultaneous rotation, thereby to permit said manual adjusting member to adjust the position of said adjusting element.

7. In a flow timer having a housing including upper, intermediate and lower walls spaced from one another, a fluid flow passage being defined between said upper and intermediate walls, a valve for controlling flow of fluid through said passage, means for sensing said fluid flow and means for actuating said valve in accordance with said sensed fluid flow, said actuating means including a manually settable adjusting element; the improvement which comprises said element being mounted on said intermediate wall and having a downwardly facing recess of non-circular cross section, a shaft having a first part axially slidably received within said recess and having a cross-sectional shape corresponding to that of said recess, said shaft extending toward and being journalled in said lower wall and having an upwardly facing shoulder remote from said first shaft part and adjacent a second shaft part having a circular cross-section, a first member drivingly connected to said sensing means, rotatably mounted on said second shaft part, and axially movable therealong into engagement with said shoulder, said shaft having a third part between said first and second parts, said third shaft part having a non-circular cross-section, a second member mounted on said third shaft part above said first member via an aperture in said second member which has a cross-sectional shape corresponding to that of said third shaft part and through which said third shaft part passes, said second member being rotatable with and axially movable along said third shaft part into engagement with said first member, and resilient means active on said second member to move it into engagement with said first member and to move said first member into rotation-transmitting engagement with said shoulder.

8. The improvement of claim 7, said adjusting element having an upwardly facing second recess of non-circular cross-section, a second shaft having a part axially slidably received within said second recess and having a cross-sectional shape corresponding to that of said second recess, said second shaft extending up to and being journalled in said upper wall, and a manual adjusting member on the exterior of said upper wall, said second shaft and said manual adjusting member being connected for simultaneous rotation, thereby to permit said manual adjusting member to adjust the position of said adjusting element.

9. In a flow timer having a housing including a fluid flow passage therethrough, a valve for controlling flow of fluid through said passage, means for sensing said fluid flow, and means for actuating said valve in accordance with said sensed fluid flow, said actuating means including a manually settable adjusting element; the improvement which comprises said adjusting element comprising a rotatable member having a cam surface extending in opposite directions from an intermediate point to lines of maximum effective radial displacement, a pair of superposed elements rotatably mounted on said member and respectively having oppositely facing shoulders, stops on said member engaging said shoulders so as to limit the rotation of said members respectively in opposite directions, resilient means operatively connected to said elements for urging them to rotate to bring their shoulders into engagement with the stops corresponding thereto, said elements having parts which, when said shoulders are against said stops, extend out radially beyond said cam surface respectively on opposite sides of said intermediate point and circumferentially inside said lines of maximum effective radial displacement to positions not substantially more radially removed than said lines of maximum effective radial displacement, said parts being circumferentially separated from one another to define a follower-receiving space therebetween, said elements being individually rotatable against the action of said resilient means, whereby, when a follower is in said space and engaging said cam surface, said member may be rotated in either direction for setting purposes.

10. The improvement of claim 9, in which said resilient means comprises a tension spring operatively connected between said elements substantially independently of said member.

11. The improvement of claim 9, in which said elements have parts extending therefrom opposite said cam surface and circumferentially spaced from one another, said resilient means comprising a tension spring operatively connected between said parts.

References Cited in the file of this patent

UNITED STATES PATENTS

| | | |
|---|---|---|
| 2,589,650 | Wolcott | Mar. 18, 1952 |
| 2,761,587 | Schantz | Sept. 4, 1956 |